June 11, 1957 R. E. SCHWERKE 2,795,667
TOGGLE SWITCHES
Filed Sept. 12, 1952
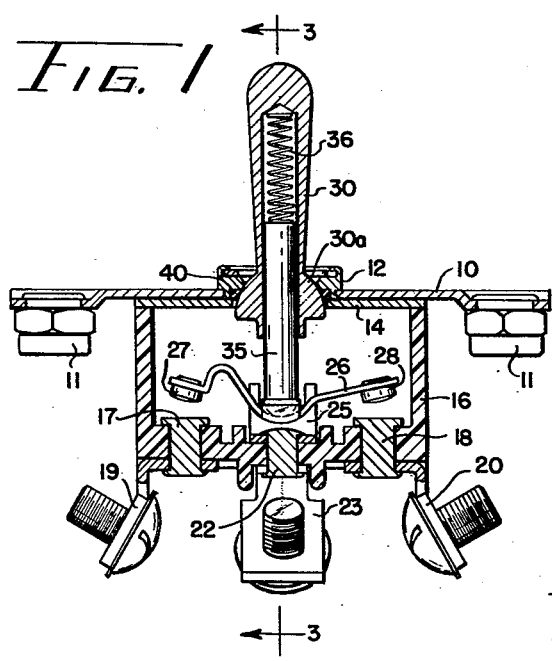
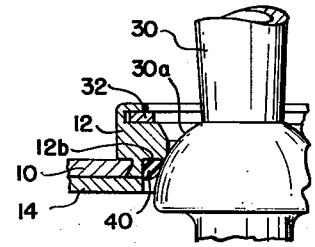
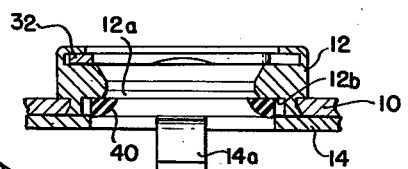
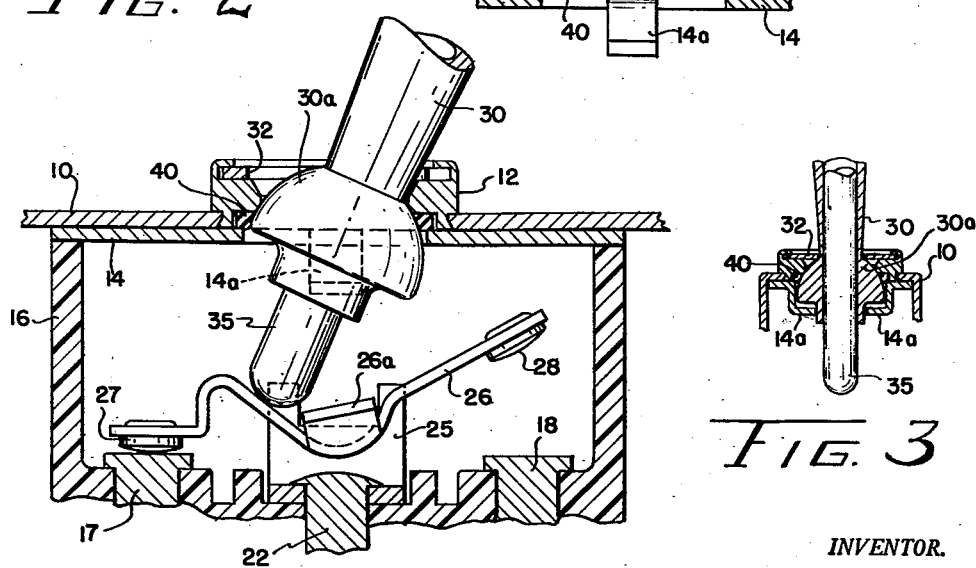
INVENTOR.
ROBERT E. SCHWERKE
BY
George H. Fisher
ATTORNEY

United States Patent Office

2,795,667
TOGGLE SWITCHES

Robert E. Schwerke, Freeport, Ill., assignor to Minneapolis-Honeywell Regulator Company, Minneapolis, Minn., a corporation of Delaware Application September 12, 1952, Serial No. 309,215

8 Claims. (Cl. 200—67)

This invention relates to toggle switches and particularly to a sealed switch of this type.

An object of the invention is to provide a toggle switch wherein sealing means is employed to prevent foreign matter from reaching the switch contacts.

Another object is to provide a toggle switch of the ball pivot type wherein a sealing ring is provided to prevent passage of moisture or other foreign material around the ball.

A further object is to provide a ball pivot toggle switch having metal to metal contact between the ball and its socket together with a sealing ring engaging both the ball and the socket.

Other objects will be apparent from the specification and claims, and from the drawing, in which Figure 1 is a longitudinal section through a toggle switch having a sealed ball pivot, Figure 2 is a similar section through the switch of Figure 1 but with the parts in a different operative position, Figure 3 is a fragmentary sectional view taken on the line 3—3 of Figure 1, Figure 4 is a fragmentary sectional view showing the normal shape of the sealing ring of Figures 1 through 3, and Figure 5 is a fragmentary sectional view showing a modified form of the invention.

In many switch applications there is the possibility of moisture or other foreign material contaminating the contacts to an extent that will impair their operation. In manually actuated switches the actuating button or lever must be exposed, and hence the opening through which the actuator enters the switch case is usually the point most vulnerable to entry of foreign material. The well known ball type toggle switch is better in this regard than other types of toggle switches in that the ball substantially fills the opening for the actuating lever at all operative positions. The joint thus provided, however, cannot be regarded as a sealed joint since fluids and small solid particles can readily enter the switch and the most that can be said is that their entry is impeded.

The toggle switch to be described in detail is provided with a seal to prevent passage of moisture or other foreign matter around the ball which serves as the pivot for the toggle lever. While a seal could be provided for forming a perfect spherical surface on the ball and a perfect complementary seat for the ball, as a practical matter such surfaces cannot be attained and a body of compliant material engaging both surfaces is required to completely close the juncture. A seal for a ball type toggle switch is shown in Stearns 2,400,849 wherein a sealing ring of compliant material is interposed between the ball and the switch case with the sealing ring acting as the bearing for the ball.

In the present invention the ball engages its seat in the switch case with metal to metal contact thus assuring a well defined pivot for the toggle lever divorced from the sealing function. The compliant sealing ring is disposed adjacent this metal to metal junction between ball and seat. The sealing ring is deformed from its normal shape when the parts are in operative position and it is the elasticity of the sealing ring that maintains it in engagement with both the ball and the member in which it is sealed. In the construction where the ball rides entirely on the sealing ring, the ring must be hard enough to form a good bearing for the ball, thus reducing its effectiveness in complying with irregularities of the surface of the ball.

An advantage of the present construction is that the frictional force resisting motion of the toggle lever is reduced over that found when the ball is pivoted entirely on an elastic surface. Since the sealing ring exerts a force on the ball only sufficient to maintain a seal, resistance to angular movement of the toggle lever is little more than that encountered with the conventional ball type toggle switch. This is particularly advantageous with switches of the "momentary" type in which return force is supplied by the switch mechanism rather than manually. Such momentary action switches must provide snap action when force is applied manually to the toggle lever, but some force tending to return the lever must remain available. If the frictional force in the lever pivot is excessive the intended switch action may not be afforded, or if the switch is designed to assure positive return it will be found to require an undesirably high actuating force. In other words, a switch made according to the invention will have better operating characteristics. An effective seal is provided without increasing the size or adding materially to the cost of the conventional ball pivot toggle switch.

The toggle switch illustrative of the invention is of the single pole double throw center off type, with positive action when thrown in one direction and momentary action when thrown in the other direction. A mounting bracket 10 is provided at its extremities with nuts 11 which are adapted to receive a pair of mounting screws. The bracket 10 may be applied to the back surface of a panel. A bushing 12 having a cylindrical periphery is staked or otherwise suitably secured to the bracket 10. The panel to which the switch is attached will, of course, be provided with an opening to receive the bushing 12. If desired, suitable means may be employed to effect a seal between the panel and the bracket 10 or bushing 12. A plate 14 lies along the undersurface of the bracket 10 and, together with the bracket 10, serves as a closure for a box shaped housing 16 which is molded of insulating material. The bracket 10 is provided with depending lateral portions which engage the housing 16 and serve to maintain the parts in assembled relation.

Stationary contacts 17 and 18 are molded or riveted into the housing 16 and at their external ends carry terminals 19 and 20. A center connection 22 is likewise molded or riveted into the housing 16 and carries an external terminal 23. A pivot bracket 25 is secured to the center connection 22 inside the housing 16 and serves to pivotally mount a contact arm 26 which carries a movable contact 27 adapted to cooperate with stationary contact 17 and a movable contact 28 adapted to cooperate with stationary contact 18. The contact arm 26 is provided with a pair of laterally extending ears 26a that engage upstanding portions of the bracket 25. When the switch arm 26 is moved in a counter-clockwise direction from the position shown in Figure 1, it will pivot about the left-hand edge of the ear 26a to the position shown in Figure 2. Likewise, when the switch arm is moved in a clockwise position from the position shown in Figure 1 it will pivot about the right-hand edge of the ear 26a.

The bushing 12 has an annular opening therethrough and is provided with a surface 12a adapted to engage and provide a socket for pivotally mounting a switch actuating toggle lever 30. The lever 30 has an enlargement intermediate its length in the form of a ball 30a which has a substantially spherical surface that seats on the surface 12a of the bushing 12. In order to confine movement of the lever 30 to a single plane a washer 32 is secured in the upper portion of the bushing 12. The washer 32 is provided with a slot the edges of which are adapted to engage the lever 30 as seen in Figure 3 to guide its movement. Also as seen in Figure 3, an additional guide for the lever 30 is provided by a pair of ears 14a formed in the plate 14 and engaging the portion of the lever 30 below the spherical portion thereof. The ears 14a serve the additional function of preventing excessive displacement of the lever 30 if an inward force is applied thereto.

The lever 30 is axially bored to receive a plunger 35 of insulating material and a spring 36 which biases the plunger 35 into engagement with the switch blade 26 and, by reaction, biases the spherical surface 30a into engagement with the surface 12a of the bushing 12.

If manual force is applied to the lever 30 tending to move it in a clockwise direction, the lever will remain substantially in the position shown in Figure 1 until sufficient force is applied to move the plunger 35 upwardly against the force of the spring 30, at which time the lever 30 will start to move and the force necessary for its movement will concurrently be reduced, resulting in continuous movement to the position shown in Figure 2. The angular relation between the plunger 35 and the switch arm 26 is such that there is a force component tending to return the lever toward its initial position. If the manually applied force on the lever 30 is reduced below this value, the lever will start to move in a counter-clockwise direction and the force tending to move the lever to the center position will constantly increase so that movement to the center position will be continuous and the switch arm 26 will be returned to the position of Figure 1 with a snap action. Movement of the lever 30 in a counter-clockwise direction to close the contacts 18—28 will be similar except that the portion of the switch arm 26 engaged by the plunger 35 has a configuration such that the spring 36, through the plunger 35, will exert a force tending to maintain the contacts in closed position, necessitating the application of external force to return the switch to its center position.

According to my invention, a sealing ring 40 is disposed in the bushing 12 adjacent the juncture between the spherical surface 30a and the abutment surface 12a of the bushing 12. The normal or undeformed shape of the sealing ring 40 is shown in Figure 4 wherein the bushing 12 and the sealing ring 40 are shown without the spherical surface 30a in place. It will be noted that the upper surface of the sealing ring 40 engages a plane surface 12b which lies in a plane normal to the axis of the opening through the bushing 12. When the spherical surface 30a is in place, as shown in Figure 2, the sealing ring is deformed radially outward by the spherical surface 30a. It will be noted that the portion of the spherical surface engaged by the sealing ring 40 is well above the center of the sphere and therefore the contracting force of the ring 40 tends to move the ring still further away from the center of the sphere and into engagement with the plane surface 12b of the bushing 12. Since a force exists tending to move the sealing ring 40 into engagement with both the spherical surface 30a and the plane surface 12b, an effective seal is provided for the joint between the bushing 12 and the lever 30. It will be noted in Figure 2 that the sealing ring 40 does not engage the cylindrical surface of the bushing 12 extending downwardly from the surface 12b and hence the only force causing the sealing ring 40 to press inwardly on the spherical surface 30a is its own annular tension. It will also be noted in Figure 2 that the plate 14 extends inwardly beyond the bushing 12 and engages the underside of the sealing ring 40. This construction is advantageous in preventing displacement of the sealing ring 40 on movement of the lever 30 as might be caused by frictional drag between the spherical surface 30a and the sealing ring.

In the modification shown in Figure 5 there is no space between the sealing ring and the internal cylindrical portion of the bushing 12. This construction has the advantage that lateral supporting of the sealing ring is afforded by the bushing 12 to prevent displacement thereof on movement of the lever 30. However, with this construction the tolerances that must be maintained on the various parts are more rigid in obtaining the desired radial force between the sealing ring and the spherical surface 30.

As mentioned before, the spring 36 supplies the force tending to maintain the spherical surface 30a in engagement with the mating surface 12a of bushing 12 and it is necessary in order to secure proper switch operation that such engagement be maintained at all operative positions of the switch. Hence, the dimensions of the sealing ring 40 and its elasticity must be such that it will not exert so great a contracting force on the spherical surface 30a as to force it out of engagement with the surface 12a of the bushing 12. Likewise, it is desirable that the sealing ring 40 exert sufficient force on the spherical surface 30a to maintain an effective seal between the lever and the bushing.

In the following claims the housing 16 together with the plates 10 and 14 and the bushing 12 are considered as parts of a case or frame for mounting the remaining portions of the switching mechanism. While two modifications of the invention have been described it will be evident that the invention could take numerous forms and the scope of the invention is therefore to be limited only by the appended claims.

I claim as my invention:

1. A toggle switch comprising, a case, a switch blade pivoted in said case, a contact carried by said case in a position to be engaged by a portion of said blade remote from its pivotal axis, a lever extending through an opening in said case and having an enlargement with a spherical surface engaging an annular abutment on said case of smaller radius than the radius of the spherical surface, an extension on said lever axially movable with respect thereto engaging a surface of said switch blade and adapted to be moved over that surface on pivotal movement of said lever in said case, a spring acting between said lever and said extension biasing said extension into engagement with the surface of said switch blade and biasing the spherical surface of the enlargement on said lever into engagement with the annular abutment on said case, and an elastic seal ring engaging said case and the spherical surface on said lever adjacent the annular abutment on said case in an annular area between a diametrical plane and the annular abutment, said ring having a normal internal radius less than the radius of the annular abutment whereby said ring acts as an annular wedge tending to separate the spherical surface from the annular abutment, said spring exerting sufficient force on said lever to overcome the contracting force of said seal ring and maintain the spherical surface in engagement with the annular abutment in all operative positions of said lever.

2. A toggle switch comprising, a case, a switch blade pivoted in said case, a contact carried by said case in a position to be engaged by a portion of said blade remote from its pivot, a lever extending through an opening in said case, a ball surface on said lever engaging said case adjacent the opening therein, said ball being larger than said opening, means interconnecting said switch blade and said lever including a spring biasing said ball surface into engagement with said case, and an elastic seal ring engaging an inner surface of said case and engaging said ball surface adjacent its engagement with said case, the inner diameter of said ring being expanded from its normal size by said ball when in engagement with said case, said ring engaging said ball on an annular surface removed from the diameter of said ball toward the opening in said case, said spring exerting sufficient force on said lever to maintain said ring in such expanded condition.

3. A toggle switch comprising, a frame, a switch actuating member, a contact carried on said member cooperating with a stationary contact on said frame, an abutment on said frame, lever means having a ball pivotally engaging an annular surface of said abutment of less radius than said ball, an actuator extending through said abutment, and means operatively connected to said switch actuating member including a spring biasing said ball into engagement with said abutment, a second surface on said abutment surrounding the annular surface of said abutment on the side thereof facing said actuating member and contacts, an elastomer seal ring in engagement with said second surface and lying between said second surface and a plane through the center of said ball, and having a normal internal shape such that said ball when in engagement with said abutment annularly tensions said ring, said spring exerting sufficient force lengthwise of said lever means on said ball to deform said seal ring and place said ball in engagement with said abutment.

4. A toggle switch comprising, a frame, a switch actuating member, a contact carried on said member cooperating with a stationary contact on said frame, an abutment on said frame, lever means having a ball pivotally engaging an annular surface of said abutment of less radius than said ball, an actuator extending through said abutment, and means operatively connected to said switch actuating member including a spring biasing said ball into engagement with said abutment, a second surface on said abutment surrounding the annular surface of said abutment on the side thereof facing said switch actuating member, and an elastomer seal ring in engagement with said second surface and lying between said second surface and a plane through the center of said ball, and having a normal internal shape such that said ball when in engagement with said abutment deforms at least a portion of said ring radially outward, said spring exerting sufficient force lengthwise of said lever means on said ball to deform said seal ring and place said ball in engagement with said abutment.

5. A toggle switch comprising, a frame, a switch actuating member, a contact carried on said member cooperating with a stationary contact on said frame, an abutment on said frame, lever means having a ball pivotally engaging an annular surface of said abutment of less radius than said ball, an actuator extending through said abutment, and means operatively connected to said switch actuating member including a spring biasing said ball into engagement with said abutment, a second surface on said abutment surrounding the annular surface of said abutment on the side thereof facing said blade and contacts, said second surface being a plane surface normal to the axis of said annular surface, an elastomer seal ring in engagement with said second surface and said ball and lying between said second surface and a plane through the center of said ball, said ring having a normal shape such that said ball when in engagement with said abutment deforms at least a portion of said ring radially outward, and means carried by said frame and engaging said ring remote from said second surface of said abutment to maintain said ring in engagement with said second surface.

6. A toggle switch comprising, a frame, a switch actuating member, a contact carried on said member cooperating with a stationary contact on said frame, an abutment on said frame, lever means having a ball pivotally engaging an annular surface of said abutment, an actuator extending through said abutment, and means operatively connected to said switch actuating member including a spring biasing said ball into engagement with said abutment, a second surface on said abutment surrounding the annular surface of said abutment on the side thereof facing said actuating member, said second surface being a plane surface normal to the axis of said annular surface being a plane surface normal to the axis of said annular surface, and an elastomer seal ring in engagement with said second surface and said ball, said ring having a normal shape such that said ball when in engagement with said abutment deforms at least a portion of said ring radially outward, the area of engagement between said seal ring and said ball lying entirely beyond a plane displaced from the center of said ball and toward said second surface, whereby the elasticity of said ring reacts with the surface of said ball to produce a force component urging said ring against said second surface.

7. A toggle switch comprising, a case, switch blade pivoted in said case, a contact carried by said case in a position to be engaged by a portion of said blade remote from its pivot, a lever extending through said case and having a spherical surface engaging a first annular surface on said case of smaller radius than the radius of the spherical surface, means interconnecting said switch blade and said lever including a spring biasing the spherical surface on said lever into engagement with the first annular surface on said case, and an elastic seal ring engaging a second annular area of said case adjacent the first annular surface thereof, and engaging an annular portion of the spherical surface of said lever adjacent the surface therof that engages said case and lying between a diametrical plane and said second annular surface, which annular surface of the spherical surface is of greater radius than the annular opening in said case but of less radius than the spherical surface, said seal ring having a normal radius less than that which it is forced to assume by the surfaces engaged.

8. A toggle switch comprising, a frame, a lever extending through an opening in said frame and having a spherical surface engaging a first annular surface on said frame, said first annular surface being of smaller radius than the radius of the spherical surface, said frame having a second annular surface adjacent the spherical surface on said lever and diverging therefrom, an elastic seal ring engaging said second annular surface and an annular area on the spherical surface on said lever adjacent said first annular surface, said last named annular area also having a maximum radius less than the radius of the spherical surface and lying in the same hemisphere as the first annular surface, said seal ring being annularly stretched from its normal size by the surfaces engaged, means for maintaining the spherical surface in engagement with said frame, and contacts actuated by said lever.

References Cited in the file of this patent

UNITED STATES PATENTS

| 343,769 | Levi | June 15, 1886 |
| 1,812,914 | Williams et al. | July 7, 1931 |
| 2,377,134 | Dietrich | May 29, 1945 |
| 2,400,849 | Stearns | May 21, 1946 |
| 2,564,938 | Warren | Aug. 21, 1951 |

FOREIGN PATENTS

| 9,744 | Great Britain | Mar. 9, 1905 |